Nov. 3, 1936.  A. SVENSSON  2,059,289
COMBINATION DRAFTING AND COMPUTING RULE
Filed April 2, 1935
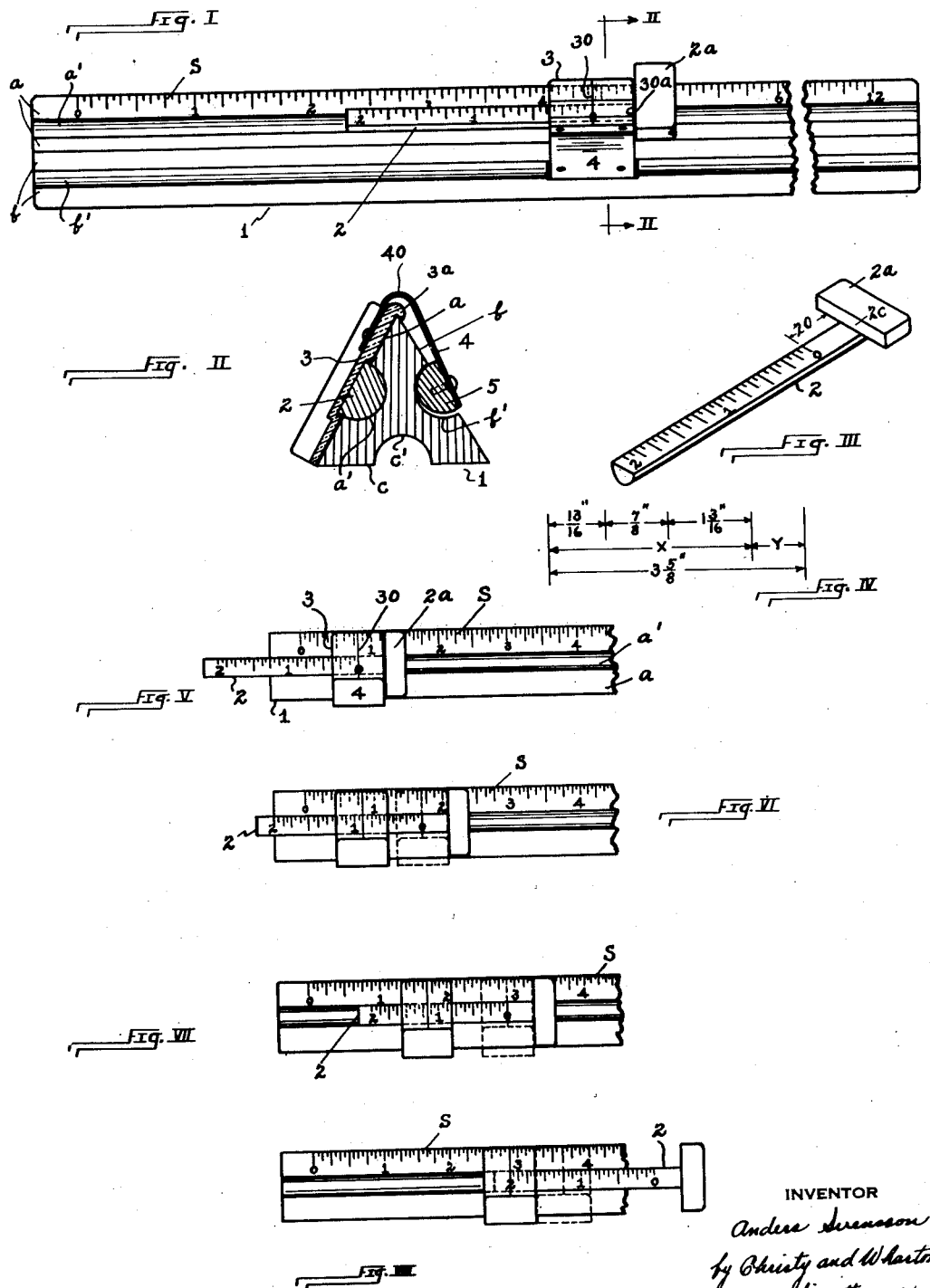
INVENTOR
Anders Svensson
by Christy and Wharton
his attorneys Patented Nov. 3, 1936

2,059,289

UNITED STATES PATENT OFFICE 2,059,289

COMBINATION DRAFTING AND COMPUTING RULE

Anders Svensson, Swissvale, Pa.

Application April 2, 1935, Serial No. 14,241

3 Claims. (Cl. 235—69)

My invention relates to computing scales or slide rules, particularly those used in making arithmetical calculations.

The object of my invention is to provide a computing scale which may be readily incorporated with a drafting rule, to the end that the draftsman may use one and the same instrument in measuring or laying out his work and in calculating and checking dimensions applied to the drawing.

The usual drafting rule is three sided, and each side carries two scales or sets of calibrations. Between the two sets of calibrations on each face is a longitudinal groove. The grooves afford means for readily grasping the rule in the fingers, whereby the rule may be lifted, or moved about on the drawing board, as desired. In accordance with my invention, I provide an auxiliary scale and an index slide; the auxiliary scale and slide are assembled with the drafting rule, whereby the instrument is serviceable in the double capacity indicated above. In making this assembly, I advantageously utilize the gripping grooves already existing in the drawing rule.

It will be perceived that several features of the invention may be used to advantage in any sort of slide rule, and it is manifest that the calibrations on the auxiliary sliding scale may be so proportioned relatively to one or another of the calibrated scales on the drafting rule that various sorts of mathematical calculations may be made. Ordinarily, the draftsman is chiefly concerned with addition and subtraction, and, in exemplary way, the embodiment shown in the accompanying drawing is adapted to perform such calculations.

Fig. I is a view in side elevation of an assembled structure; Fig. II is a sectional view to larger scale, and taken on the plane II—II of Fig. I; Fig. III is an isometric view of the auxiliary scale; Fig. IV shows a typical set of dimensions to be applied to a drawing—two of the dimensions "X" and "Y" are unknown and must be computed; and Figs. V to VIII are fragmentary views of the assembled scale structure, illustrating the steps pursued in determining the dimensions "X" and "Y" in Fig. IV.

Referring to the drawing, the reference character 1 is applied to a drafting rule or scale of well-known type. The rule comprises an elongate body of triangular cross-section, and its three sides $a$, $b$, and $c$ severally include medial, longitudinally extending grooves $a'$, $b'$, and $c'$, by means of which the draftsman may readily grasp the scale in use. There are usually six calibrated scales provided on the rule—two scales on each of its three side faces, extending along the opposite ridges or apices where the particular side face intersects the two remaining faces of the rule body. To simplify an understanding of the invention, I shall consider only the "inch" scale S of the rule, and in the drawing I have not illustrated the other calibrations or scales with which the rule is normally provided.

An auxiliary calibrated scale 2 is provided; the scale 2 is relatively short, and in cross-section corresponds to the grooves in the rule 1; the auxiliary scale may be readily placed in the open grooves of the rule; and there need be no interlocking engagement between the auxiliary scale itself and the body of the rule 1. Since the auxiliary scale 2 is to cooperate in this case with the "inch" scale S, it is shown positioned in the groove $a'$, and the calibrations on the face of the auxiliary scale are in inches, numbered progressively from right to left, whereas the calibrations of scale S are numbered from left to right.

Cooperating with the auxiliary scale 2 is a slide which serves to secure the auxiliary scale in the groove $a'$, while permitting the sliding of the scale along the groove, or the movement of the slide relatively to the rule 1 and scale 2. The slide comprises a transparent body 3 of glass or celluloid; the body 3 includes a shoulder $3a$ at its upper edge, which in assembly rests slidably upon the upper apex of the rule, as shown in Fig. II, and from such shoulder the body 3 extends downward and overlies the side face $a$ of the rule. Advantageously, the body of the auxiliary scale 2 is so proportioned in cross-section that its calibration-bearing face projects or lies outward an interval from the face $a$ of the rule 1, and the transparent body 3 is grooved on its under side, to receive and embrace the projecting portion of the scale 2 (Fig. II). Secured to the upper portion of body 3 is a thin leaf spring 4, which, extending upward and over the apex of the rule upon which shoulder $3a$ rests, continues downward over the side face $b$ of the rule 1. At its lower end the member 4 carries a semicylindrical element 5 which, under the inherent resiliency of said member 4, is urged inward and yieldingly held in groove $b'$. The element 5 is slightly smaller in cross-section than the groove $b'$, and the parts are otherwise so proportioned that the effective engagement between the groove $b'$ and element 5 is eccentric of the groove, as indicated in Fig. II. The member 4 may be bowed in cross-section, as shown at 40, whereby the spring effect is concentrated above the central apex of the rule 1. Thus, the slide structure 3, 4, 5 mechanically cooperates with the auxiliary scale 2 in groove a' and with the groove b'; the slide structure serves to secure the auxiliary scale 2 in assembly with the rule 1, and two otherwise useful grooves of the rule 1 are utilized in slidably securing the auxiliary scale and the slide in the assembly.

It will be perceived that one face of the rule 1—the bottom face in Fig. II—is entirely free, so that the instrument will lie flat upon a drawing board, and may be readily used in making precise measurements in the usual way.

The auxiliary scale 2 is provided with a head 2a that in assembly projects outward from the face of scale 2, and overlies the face a of the rule 1. The head 2a provides readily accessible means for effecting the movement of the relatively short scale 2 along the groove a'.

As usual in slide rules, the slide 3, 4 includes a hair line index 30, by means of which the slide may be accurately positioned at a desired point on either set of calibrations, and alternately, one set of calibrations may be adjusted in desired position relatively to the other. The cardinal or "zero" calibration on the auxiliary scale 2 is located an interval 20 (Fig. III) from the edge 2c of the head 2a, and advantageously the index 30 is located an equal interval from the edge 30a of the slide. Thus, when the slide is brought to abutment with the head 2a, as shown in Fig. I, the index 30 lies in precise registry with the "zero" of scale 2. This feature is of advantage in operation, as may be understood in the following description of operation.

In Fig. IV, the draftsman knows the overall dimension 3⅝", and the three intervening dimensions 1⅜", ⅞" and 1³⁄₁₆", and desires quickly to determine the dimensions "X" and "Y". First the slide 3, 4, is adjusted on rule 1 with the index 30 in registry with 1⅜ on the rule scale S (Fig. V); then the auxiliary scale 2 is advanced until its "zero" registers with the index 30, this being readily accomplished by bringing the head or abutment 2a into engagement with the slide. Next, the auxiliary scale 2 is slid to the right, to such position that the ⅞ calibration on its face registers with the index 30; while holding scale 2 immovable, the slide 3, 4 is moved to a position against the head 2a, whereby the index 30 orients the "zero" on the auxiliary scale 2 with an evaluating calibration (1¼) on the rule scale S, as shown in dotted lines in Fig. VI; then the auxiliary scale 2 is moved to the right, until 1³⁄₁₆ on its face registers with index 30, as shown in full lines in Fig. VII; thereupon the slide is again moved into engagement with the head 2a, and the index 30 then registers with 2⅞ on scale S, representing the total "X" of the three known dimensions. (Note the dotted line position of the index 30 in Fig. VII.) To find "Y", the slide is held at 2⅞ and the scale 2 is moved right, until its left-hand calibration, denoted by the numeral 2 on the scale, lies in registry with the index 30; and then the slide is moved to a position in which the index 30 registers with the given value 3⅝ on the scale S, the operation being indicated in Fig. VIII. Reading the auxiliary scale 2 from left to right—from the Figure 2 on the auxiliary scale to the index 30 set at 3⅝ on scale S—the answer will be found to be ¾. Thus, "Y" is determined as ¾".

Other and more involved calculations may be made, but a consideration of them is deemed unnecessary.

I claim as my invention:

1. A device for assembly with a longitudinally grooved drafting rule of triangular cross-section, which device includes an auxiliary scale adapted for sliding engagement in a groove in said rule, a slide adapted in assembly to overlie one of the triangular ridges of said rule, said slide including two body portions adapted to extend severally downward over the two inclined faces of said rule that meet in said ridge, said slide including an index member overlying said scale, and means for securing the slide and scale in slidable assembly upon said two faces of the rule, while leaving the third face of the rule free, as described.

2. In combination with a longitudinally grooved rule of triangular cross-section, an auxiliary scale slidably engaging a groove in said rule, a portion of said scale being offset from the side face of said rule extending from opposite sides of said groove, an index slide overlying one of the triangular ridges of said rule, said slide including two body portions extending severally downward over the two inclined faces that meet in said ridge, one of said body portions of the slide being shaped to engage said offset portion of said scale, and said other body portion of the slide including means engaging the body of the rule and cooperating with the engagement of the slide with the scale in securing the scale and slide in assembly with the rule.

3. In combination, a calibrated drafting rule, an auxiliary calibrated scale, said auxiliary scale carrying an abutment spaced from its cardinal calibration, and a slide adapted to engage said abutment, said slide including an index spaced from its abutment-engaging portion an interval equal to the interval between the abutment and the cardinal calibration of said auxiliary scale, said slide and said auxiliary scale with its abutment being severally movable longitudinally of said drafting rule and relatively to one another, whereby, by moving said auxiliary scale, said abutment may be positioned at predetermined points longitudinally of said drafting rule, and, by moving said slide into engagement with said abutment, the cardinal calibration on said auxiliary scale may be accurately and quickly oriented with a significant calibration on the drafting rule longitudinally of which said slide and said auxiliary scale are severally movable.

ANDERS SVENSSON.